(12) United States Patent
Smith

(10) Patent No.: US 8,424,805 B2
(45) Date of Patent: Apr. 23, 2013

(54) AIRFOIL STRUCTURE

(76) Inventor: Donald Smith, Pompano Beach, FL (US)

( * ) Notice: Subject to any disclaimer, the term of this patent is extended or adjusted under 35 U.S.C. 154(b) by 953 days.

(21) Appl. No.: 12/574,726

(22) Filed: Oct. 7, 2009

(65) Prior Publication Data

US 2013/0068888 A1    Mar. 21, 2013

(51) Int. Cl.
*B64C 1/00* (2006.01)
(52) U.S. Cl.
USPC .................................. 244/123.1; 244/123.12
(58) Field of Classification Search ............. 244/123.1, 244/123.12, 123.7, 123.8, 123.9
See application file for complete search history.

(56) References Cited

U.S. PATENT DOCUMENTS

| | | | | |
|---|---|---|---|---|
| 2,218,122 A | * | 10/1940 | Scheller et al. | 244/123.8 |
| 2,470,128 A | | 5/1949 | Barrick et al. | |
| 2,791,386 A | * | 5/1957 | Kastan | 244/123.8 |
| 2,997,262 A | | 8/1961 | Kirk et al. | |
| 3,023,860 A | | 3/1962 | Ellzey | |
| 3,246,469 A | | 4/1966 | Moore | |
| 3,523,853 A | | 8/1970 | Thomas | |
| RE27,747 E | | 9/1973 | Johnson | |
| 4,084,029 A | * | 4/1978 | Johnson et al. | 428/119 |
| 4,197,341 A | | 4/1980 | Rule | |
| 4,304,376 A | | 12/1981 | Hilton | |
| 4,481,703 A | * | 11/1984 | Scott | 29/525.06 |
| 4,643,933 A | | 2/1987 | Picken | |
| 4,667,905 A | * | 5/1987 | Hamm et al. | 244/123.13 |
| 5,332,178 A | | 7/1994 | Williams | |
| 5,848,765 A | * | 12/1998 | Gillespie | 244/124 |
| 6,276,044 B1 | | 8/2001 | Ragland et al. | |
| 6,524,074 B2 | | 2/2003 | Farrar et al. | |

(Continued)

FOREIGN PATENT DOCUMENTS

| | | |
|---|---|---|
| JP | 5185542 | 7/1993 |
| JP | 8290497 | 11/1996 |

OTHER PUBLICATIONS

Vectorply, C-TTX 1800, Material Data Sheet for Basalt Composite Reinforcement Fabric, available at www.vectorply.com as of Oct. 7, 2009.

*Primary Examiner* — Christopher P Ellis
(74) *Attorney, Agent, or Firm* — McHale & Slavin, P.A.

(57) ABSTRACT

An airfoil structure including a plurality of molded monolithic members that extend in a side-by-side manner along the spanwise direction of the airfoil structure. Each molded monolithic member is realized from continuous material that is molded to form a corrugated portion with top and bottom flange portions extending from the corrugated portion. As a result of the molding operation, the corrugated portion is integrally formed with and structurally joined to the top and bottom flange portions. The top flange portions of the side-by-side arrangement of molded monolithic members define a portion of the top surface of the airfoil structure. The bottom flange portions of the side-by-side arrangement of molded monolithic members define a portion of the bottom surface of the airfoil section. The corrugated portions of the side-by-side arrangement of monolithic members define internal support structures (preferably closed-cell cores) extending along the spanwise direction of the airfoil structure. The side-by-side arrangement of monolithic members structurally integrates portions of the top skin and bottom skin to support structures that extend between such top and bottom surface portions. Such structural integration provides enhanced structural resistance to torsional loading of the airfoil section due to the fact that such loads are resisted by the continuous material that makes up the both top and bottom surfaces as well as the support structures extending therebetween.

59 Claims, 13 Drawing Sheets

U.S. PATENT DOCUMENTS

| | | |
|---|---|---|
| 6,538,340 B2 | 3/2003 | Elder |
| 6,544,623 B1 | 4/2003 | Straza |
| 6,558,777 B2 | 5/2003 | Yoshii |
| 6,720,060 B1 | 4/2004 | Swars |
| 6,889,937 B2 * | 5/2005 | Simpson et al. ........... 244/123.1 |
| 6,910,659 B2 | 6/2005 | Friddell et al. |
| 6,976,343 B2 * | 12/2005 | McGushion .................... 52/840 |
| 7,080,805 B2 * | 7/2006 | Prichard et al. ........... 244/117 R |
| 7,198,471 B2 | 4/2007 | Gunneskov et al. |
| 7,681,835 B2 * | 3/2010 | Simpson et al. ........... 244/123.3 |
| 7,828,246 B2 * | 11/2010 | Ashton et al. ................. 244/124 |
| 7,954,763 B2 * | 6/2011 | Kulesha ..................... 244/123.1 |
| 7,975,964 B2 * | 7/2011 | Schmidt et al. ........... 244/123.1 |
| 8,091,830 B2 * | 1/2012 | Childs ........................ 244/123.8 |

\* cited by examiner

AIRFOIL STRUCTURE

BACKGROUND OF THE INVENTION

1. Field of the Invention

This invention relates broadly to airfoil structures. More particularly, this invention relates to airfoil structures employing molded materials for components of the airfoil structure.

2. State of the Art

An airfoil is a body designed to obtain reaction upon its surface from air through which it moves or from air that moves past it. Airfoils are used in many applications, such as aircraft wings, ailerons, stabilizers, wind turbine blades (which generally include two types, horizontal axis blades and vertical axis blades), helicopter rotors, propellers, fan blades, etc. Airfoils include a characteristic cross-sectional shape as shown in FIG. 1, including a rounded leading edge, a trailing edge, and top and bottom skins defining an upper chamber section and lower chamber section over a cord extending between the leading edge and trailing edge. The asymmetry between the top and bottom skins of the airfoil produces aerodynamic forces acting on the top and bottom skins as air moves past these surfaces, even at a zero angle of attack. For aircraft wings and the like, these aerodynamic forces generate lift that is used to fly the aircraft. For helicopter rotors, propellers and the like, these aerodynamic forces generate thrust that is used to propel and fly the aircraft. For wind turbine blades, these aerodynamic forces cause rotation of the blade for driving a turbine that converts mechanical rotation of the blade into electrical power. For most applications, the cross-sectional shape of the airfoil tapers over a spanwise direction from root to tip from a relatively thick cross-section at the root to a relatively thin cross-section at the tip. Moreover, for some applications, such as wind turbine blades, the cross-sectional shape of the airfoil can bow, twist and/or curve over the spanwise direction to accommodate centrifugal forces and/or optimize the angle of attack of the blade relative to the wind in order to smooth rotational speed of the blade and reduce pulses that are common in vertical-axis wind turbine designs.

Airfoils generally include one or more solid web elongate spars that extend along the spanwise direction of the airfoil and can also include a plurality of transverse ribs spaced apart along the spanwise direction that define the cross-sectional shape of the air foil. Top and bottom skins are fixed to the spars and ribs and make up the aerodynamic outer surface of the airfoil. Coatings and/or paints can be applied to the skins in some applications. The spar(s), ribs and skins resist the shear, compression, bending and buckling, and tensional and tensional twist loads applied to the airfoil during use. The spar(s) primarily resist bending and buckling loads and the shear loads that result therefrom. The ribs primarily resist tensional twist loads. And the skins act as flanges that resist bending and buckle loading, compression loading, as well as tensional and tensional twist loading. Moreover, the skin can experience shear stress from bending and buckling, compression and tensional and tensional twist loads. Such shear stress can lead to failure of the skin (typically involving delamination of the skin and possibly loss of skin sections from the airfoil), which can potentially compromise the structural integrity of the airfoil.

Many contemporary airfoils are hollow. In such hollow designs, all of the forces acting on the airfoil (including forces that result from bending and buckling, compression and tensional and tensional loading) are channeled through the skin, which significantly increases the shear stresses imparted on the skin during use. Hereto, such shear stress can lead to failure of the skin (typically involving delamination of the skin and possibly loss of skin sections from the airfoil), which can potentially compromise the structural integrity of the airfoil.

As an airfoil increases in size, the bending, buckling, tensional and tensional twist loads imparted on the airfoil increase. Such increased loading requires skin and/or spar designs that utilize more material in an effort to ensure the structural integrity of the airfoil. At the same time, larger dimensions and weight reduce the strength-to-weight ratio of the airfoil. For aircraft wings and helicopter rotors, the increase in weight of the airfoil increases the power required to move the airfoil and thus reduces fuel efficiency. For wind turbine blades, the increase in weight of the airfoil significantly decreases the generating efficiency of the wind turbine system.

SUMMARY OF THE INVENTION

The invention provides an airfoil structure that affords a strength-to-weight ratio that is improved relative to the prior art designs.

The invention provides an airfoil structure that resists shear stress arising from loads applied to the airfoil structure, and aids in reducing skin failures that can result from such shear stress.

The invention provides an airfoil structure that can be assembled in an efficient and cost effective manner.

An airfoil structure in accordance with the present invention includes a root, a tip, and a span extending along a spanwise direction between the root and the tip. The span has a top surface opposite a bottom surface. At least part of the span is defined by a plurality of molded monolithic members that extend in a side-by-side manner along the spanwise direction. Each molded monolithic member includes a corrugated portion with a top flange portion and a bottom flange portion extending from the corrugated portion. The corrugated portion is integrally formed with and joined to the top flange portion and the bottom flange portion. The top flange portions of the side-by-side arrangement of molded monolithic members define a portion of the top surface of the airfoil, and the bottom flange portions of the side-by-side arrangement of molded monolithic members define a portion of the bottom surface of the airfoil. The corrugated portions of the side-by-side arrangement of molded monolithic members define internal support structures (preferably closed-cell cores) extending along the spanwise direction of the airfoil, which provides structural resistance to bending-moment forces and torsional forces acting on the airfoil structure.

It will be appreciated that the airfoil structures described herein structurally integrate portions of the top and bottom surfaces of the span as well as internal support structures that extend between such top and bottom surfaces. Such structural integration provides enhanced structural resistance to torsional loading of the airfoil along the span due to the fact that such loads are resisted by the continuous molded material that makes up both the top and bottom surfaces as well as the support structures extending therebetween. Such enhanced structural resistance reduces (and preferably eliminate) the need for additional material to stiffen the skin of the airfoil, and thus provides for improved strength-to-weight characteristics of the airfoil while avoiding issues of interlaminar shear stress within skins of composite airfoils, including shear failure of the skin to core that are problematic with composite airfoils.

According to one embodiment of the invention, the top flange portions of adjacent molded monolithic members overlap one another to define portions of the top skin of the airfoil section, and the bottom flange portions of adjacent molded monolithic members overlap one another to define portions of the bottom skin of the airfoil structure. The overlapping top and bottom flange portions can have a stepped interface to aid in side-by-side alignment of molded monolithic members.

According to another embodiment of the invention, at least one non-corrugated sheet is disposed between the corrugated portions of adjacent molded monolithic members along the spanwise direction of the airfoil structure to provide structural resistance primarily to bending-moment forces and compression forces acting on the airfoil structure.

According to yet another embodiment of the invention, the shape and/or dimensions of the molded monolithic members can vary across the spanwise direction to provide a desired shape or profile along the spanwise direction. The shape and/or dimensions of the molded monolithic members can also vary across the chordwise direction to provide a desired shape or profile along the chordwise direction. Moreover, the molded monolithic members can be adapted to be secured together in a nested manner to provide a desired profile along the spanwise direction of said airfoil structure. The desired profile can substantially lie in a flat plane along the spanwise direction, or twist clockwise or counterclockwise along the spanwise direction in order to vary angle of incidence of the airfoil structure along the spanwise direction.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
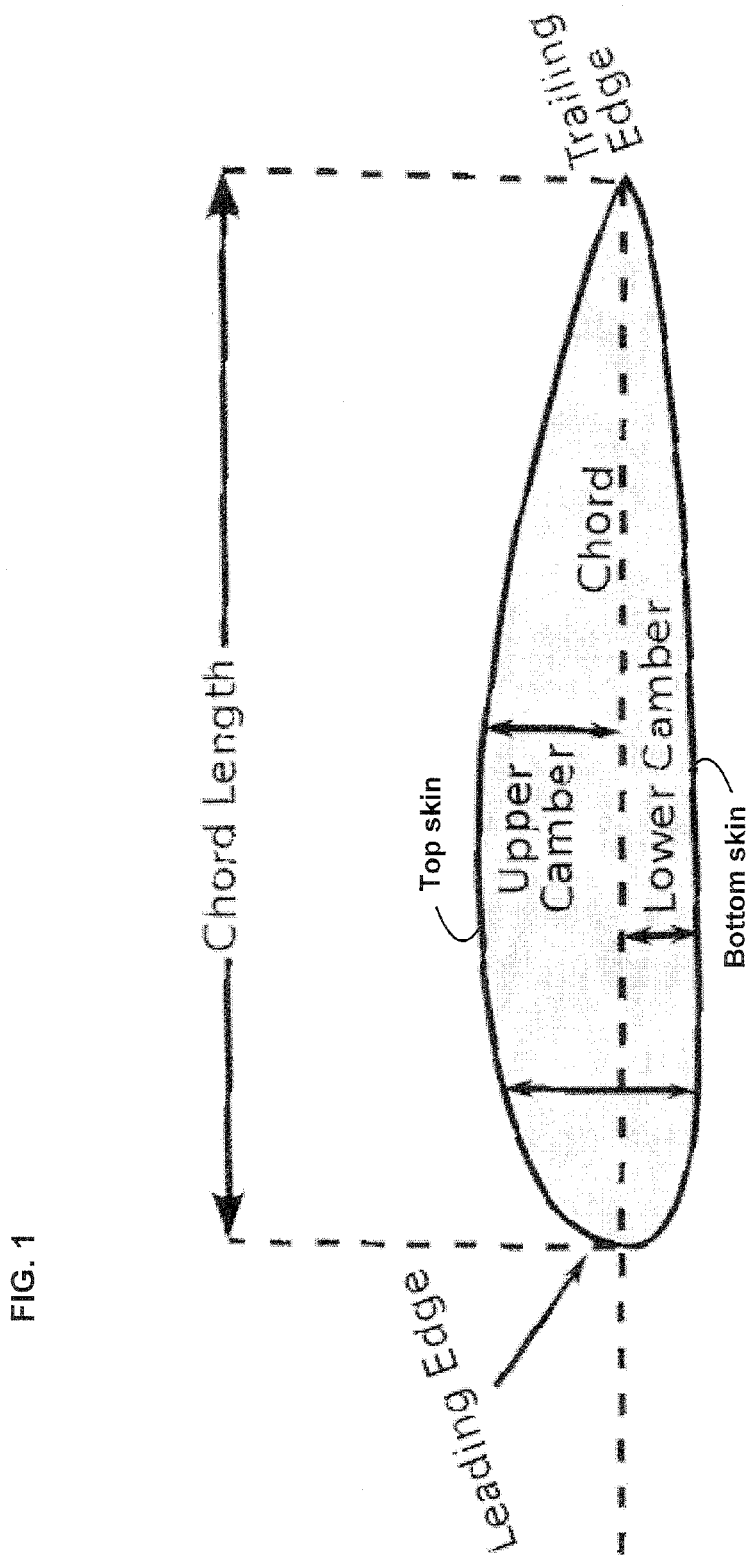
FIG. 1 is a schematic illustration of the cross-section of a prior art airfoil.
Figure 2A:
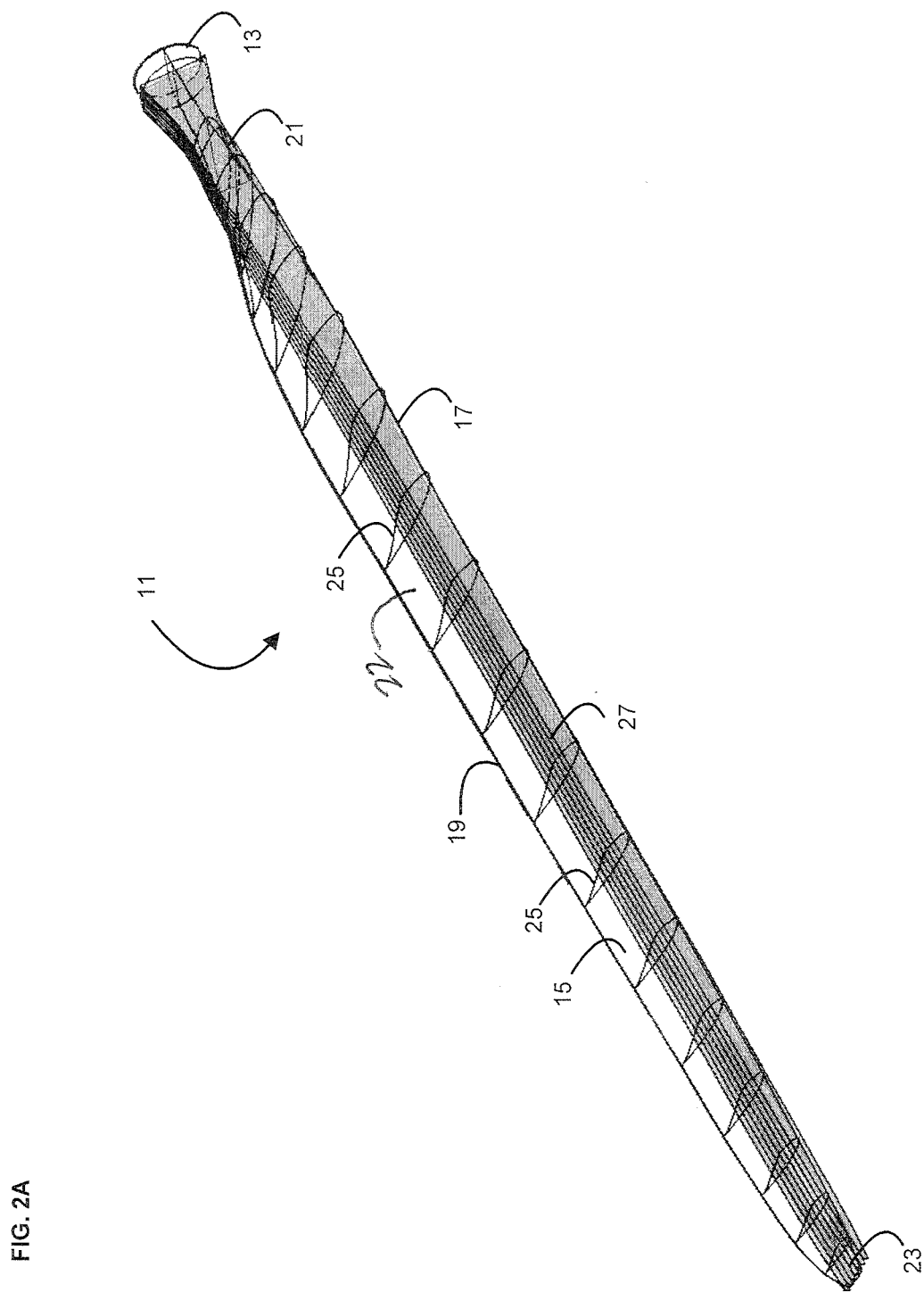
FIG. 2A is an isometric schematic view of an exemplary horizontal-axis wind turbine blade that embodies an airfoil structure in accordance with the present invention.
Figure 2B:
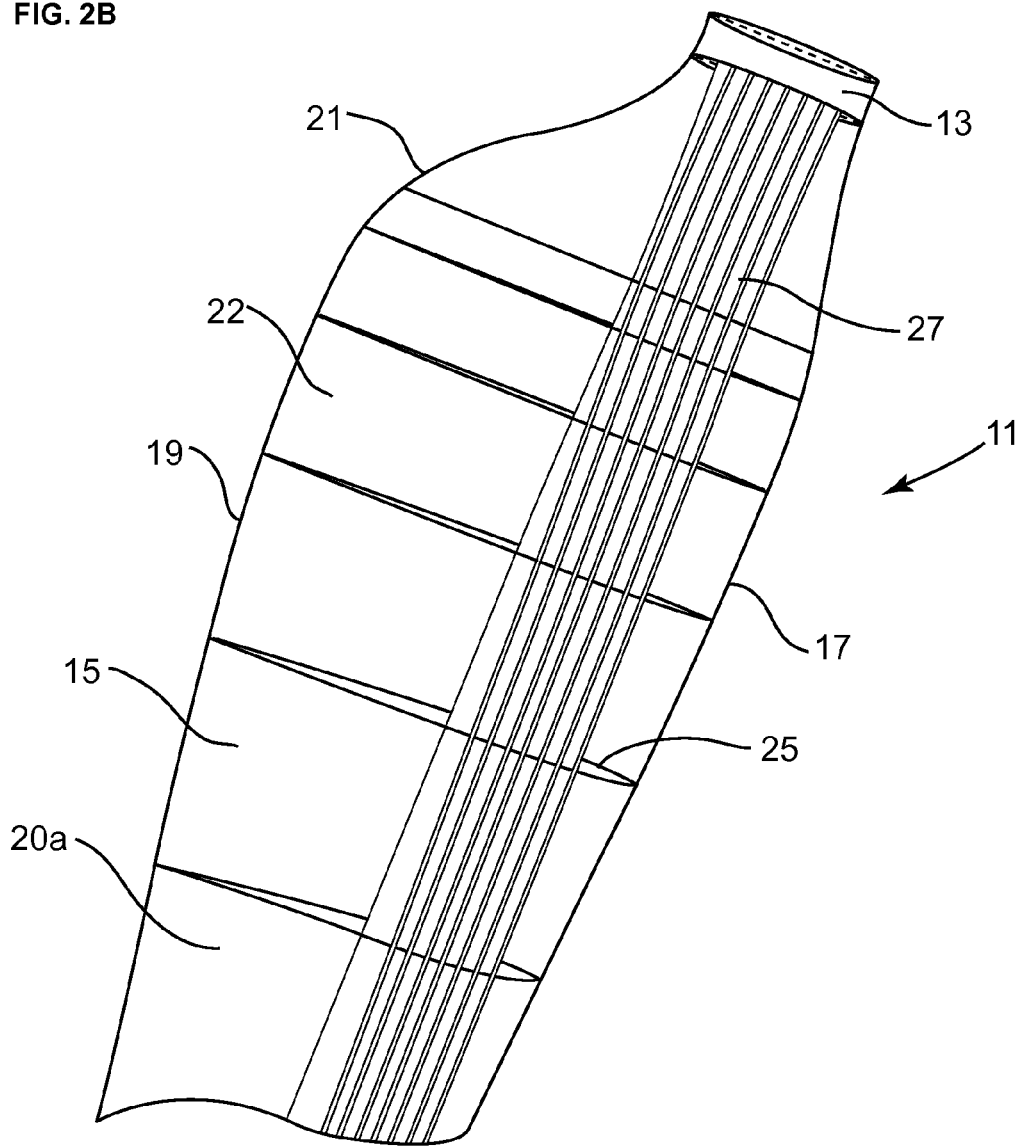
FIG. 2B is a top view of the wind turbine blade of FIG. 2A.

Turning now to FIGS. 2A and 2B, an exemplary horizontal axis wind turbine blade 11 that embodies the present invention includes a mount section 13 for mounting to the hub (not shown) of a wind turbine generator as is well known. The mount section 13 supports an airfoil section 15 that extends therefrom. The airfoil section 15 has a characteristic cross-sectional airfoil shape including a rounded leading edge 17, a trailing edge 19, and top and bottom surfaces 20a, 20b (FIGS. 2B, 4A, 4B) defining an upper chamber and lower chamber over a cord extending between the leading edge 17 and trailing edge 19 as shown in FIG. 1. The bottom surface 20b of the blade 11 extends between the leading edge 17 and trailing edge 19 on the opposite side of the blade 11.

FIGS. 2A and 2B include notations 25 that outline the cross-sectional profile of the blade 11 over a span 22 extending between a root 21 and a tip 23. These notations 25 show that the cross-sectional shape of the airfoil section 15 tapers over the spanwise direction from a relatively thick cross-section at the root 21 to a relatively thin cross-section at the tip 23. Note that such notations 25 do not denote physical structure. The cross-sectional shape of the airfoil section 15 can also bend or twist over the spanwise direction as desired.

The mount section 13 and the airfoil section 15 preferably include one or more stringers 27 that extend along the spanwise direction of the blade 11 as shown in FIGS. 2A and 2B. The stringer(s) 27, which is(are) preferably located in the central portion of the mount section 13 and the relatively thick part of the cord of the airfoil section 15, are elongate reinforcing strip(s) that extend through the upper camber and lower camber between the top and bottom skins to provide structural reinforcement that primarily resists compression and bending loads applied to the blade 11. In the exemplary embodiment shown, the mount section 13 and the airfoil section 15 include a set of seven stringers 27 that are spaced apart from one another over the length of the mount section 13 and the airfoil section 15 as evident from FIGS. 2A and 2B. In the preferred embodiment, the stringers 27 are realized from a composite structure (such as carbon fibers) with a higher modulus than other composite structures of the blade 11 to ensure that the stringers 27 carry the principal components of the shear and bending loads applied to the blade 11. It is contemplated that other high modulus support members, such as a composite box frame and the like, can be used in conjunction with stringers 27 or as a substitute for the stringer(s) 27 in order to carry the principal components of the compression and bending loads applied to the blade 11.

Figure 2C:
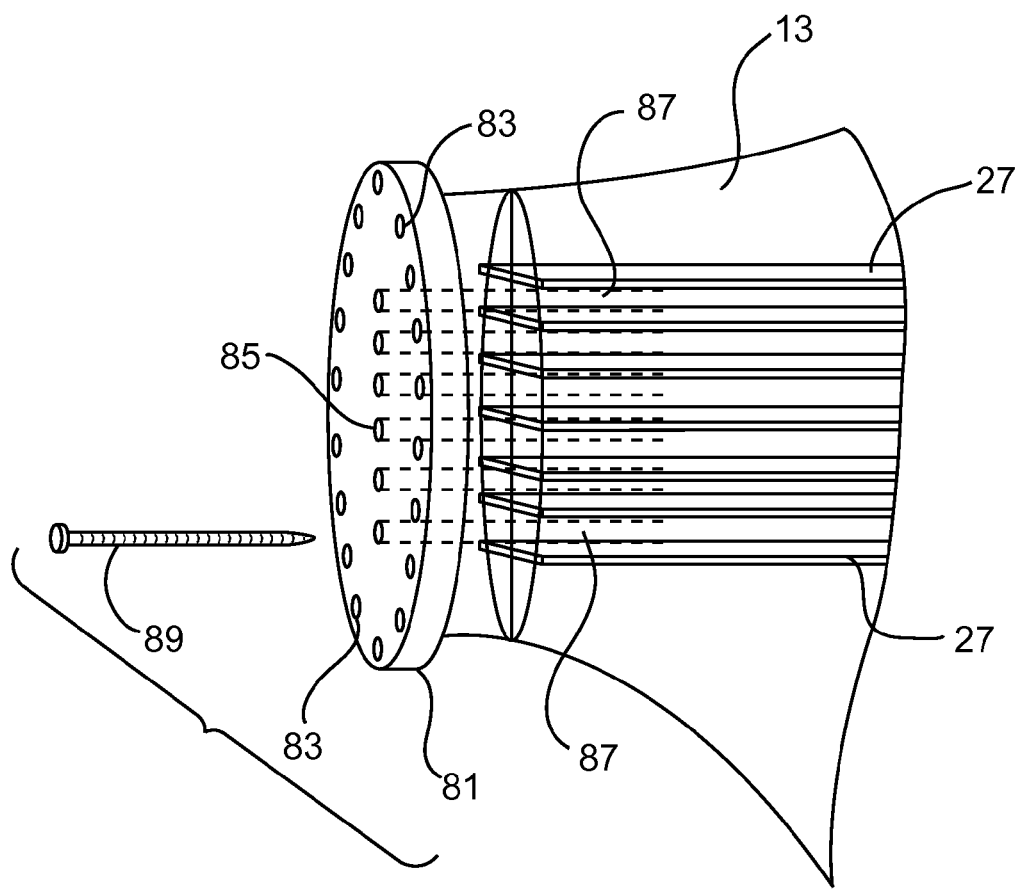
FIG. 2C is a partially exploded schematic view of an exemplary embodiment of a mount section of the turbine blade of FIGS. 2A and 2B.

In the preferred embodiment of the present invention as shown in FIG. 2C, the mount section 13 of the blade 11 includes a laminate structure of reinforcement stringers 27 that extend from the root of the airfoil section 15 as described above. A mounting flange 81 is provided with a set of bolts holes 83 about its periphery that provide for bolt-on connection to the hub (not shown) of the wind turbine generator. The flange 81 also includes a set of central holes 85 that are aligned with central boreholes 87 extending in the spanwise direction into the central portion of the mount section 13 reinforced by the laminate structure of stringers 27. Threaded bolts or rods 89 (one shown) are inserted through the holes 85 and screwed into the central boreholes 87 in order to secure the mounting flange 81 to the reinforced portion of the mount section 13 of the blade 11. The flange 81 and the blade 11 secured thereto are then bolted to the hub of the of the wind turbine generator in order to mount the blade 11 to the hub. The threaded bolts or rods 89 can be substituted by other suitable mechanical fasteners in order to secure the flange 81 to the mount section 13.

Figure 3:
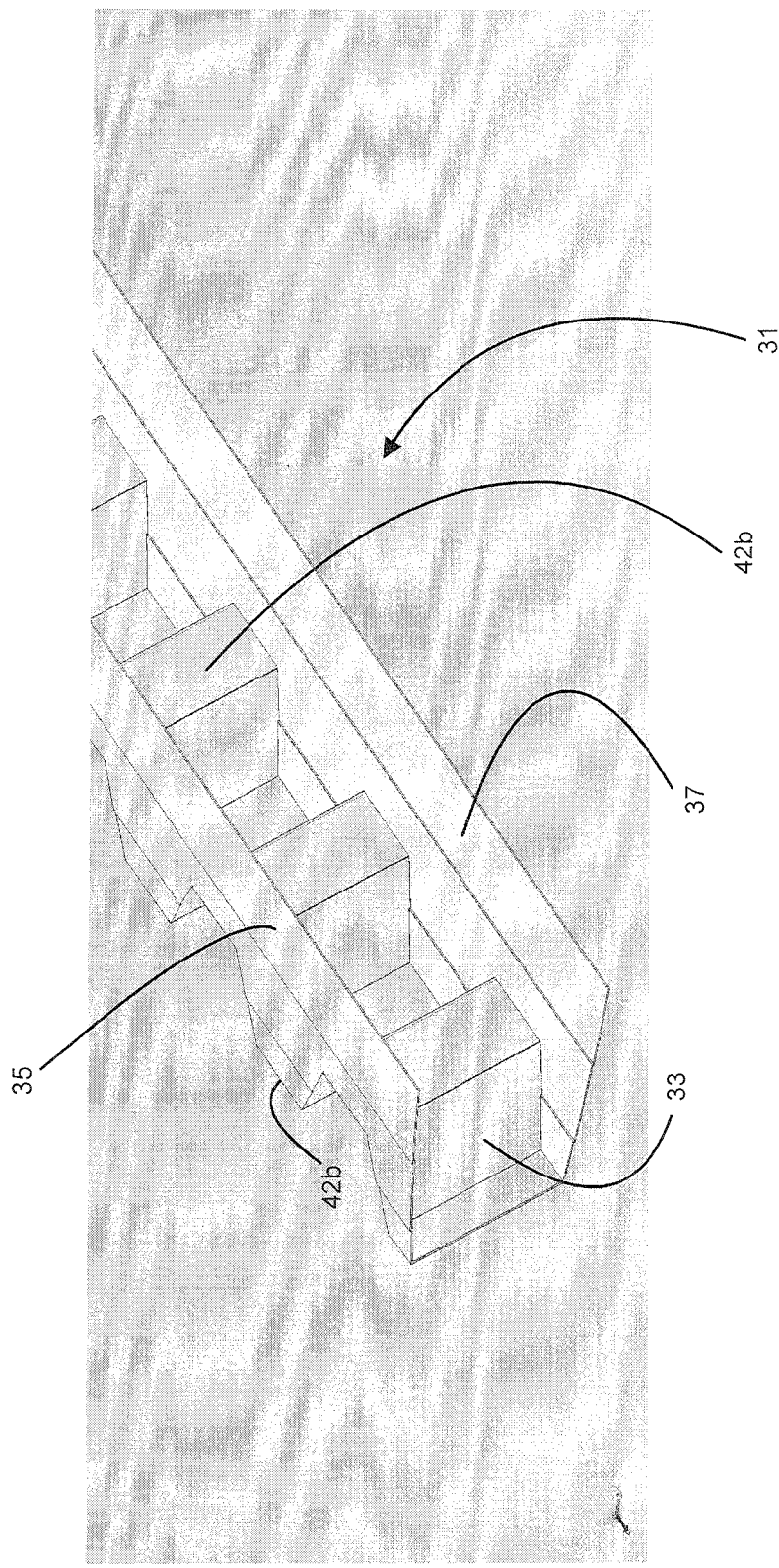
FIG. 3 is an isometric rear view of a molded monolithic member that is used as a building block structure to realize portions of the airfoil structure of the wind turbine blade of FIGS. 2A and 2B.
Figure 4A:
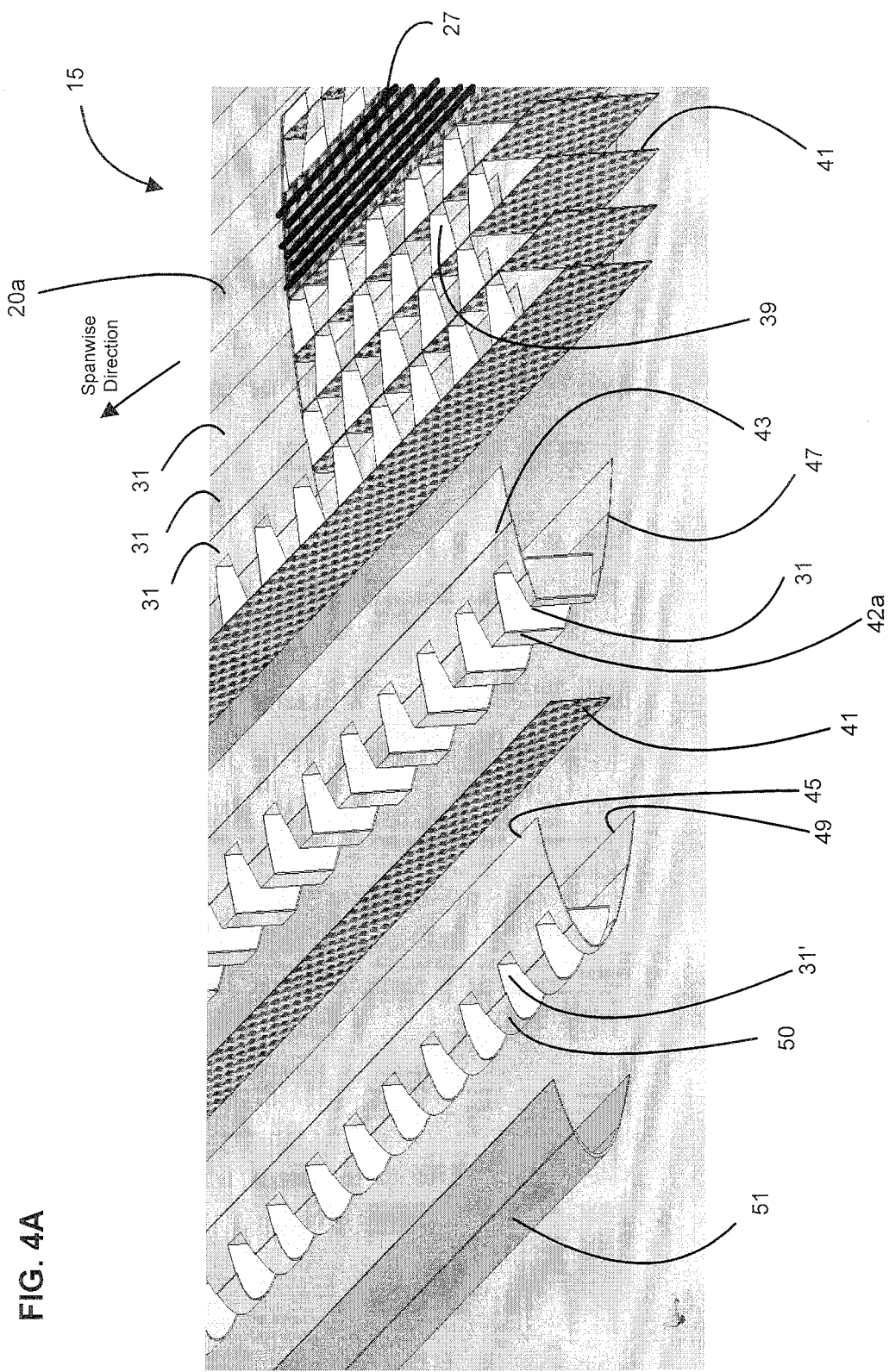
FIG. 4A is a schematic top view of a chordwise portion of the airfoil structure of the wind turbine blade of FIGS. 2A and 2B as it is being built; the view includes an number of parts (31, 31', 51) exploded from their position in the final assembly; on the right side, part of the top skin is cut-away to illustrate the structures thereunder in the final assembly.
Figure 4B:
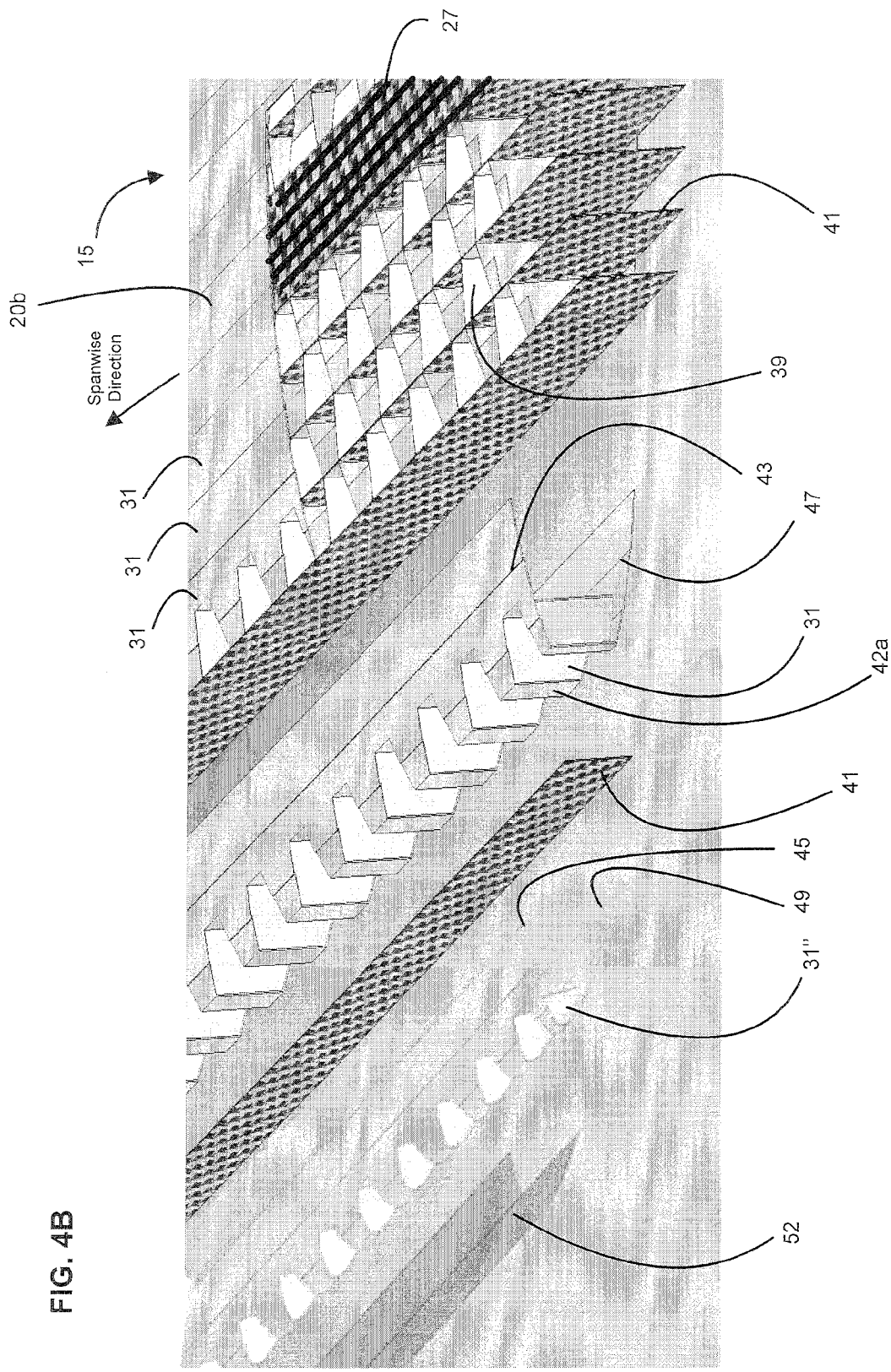
FIG. 4B is a schematic bottom view of a chordwise portion of the airfoil structure of the wind turbine blade of FIGS. 2A and 2B as it is being built; the view includes an number of parts (31, 31", 52) exploded from their position in the final assembly; on the right side, part of the bottom skin is cut-away to illustrate the structures thereunder in the final assembly.
Figure 5:
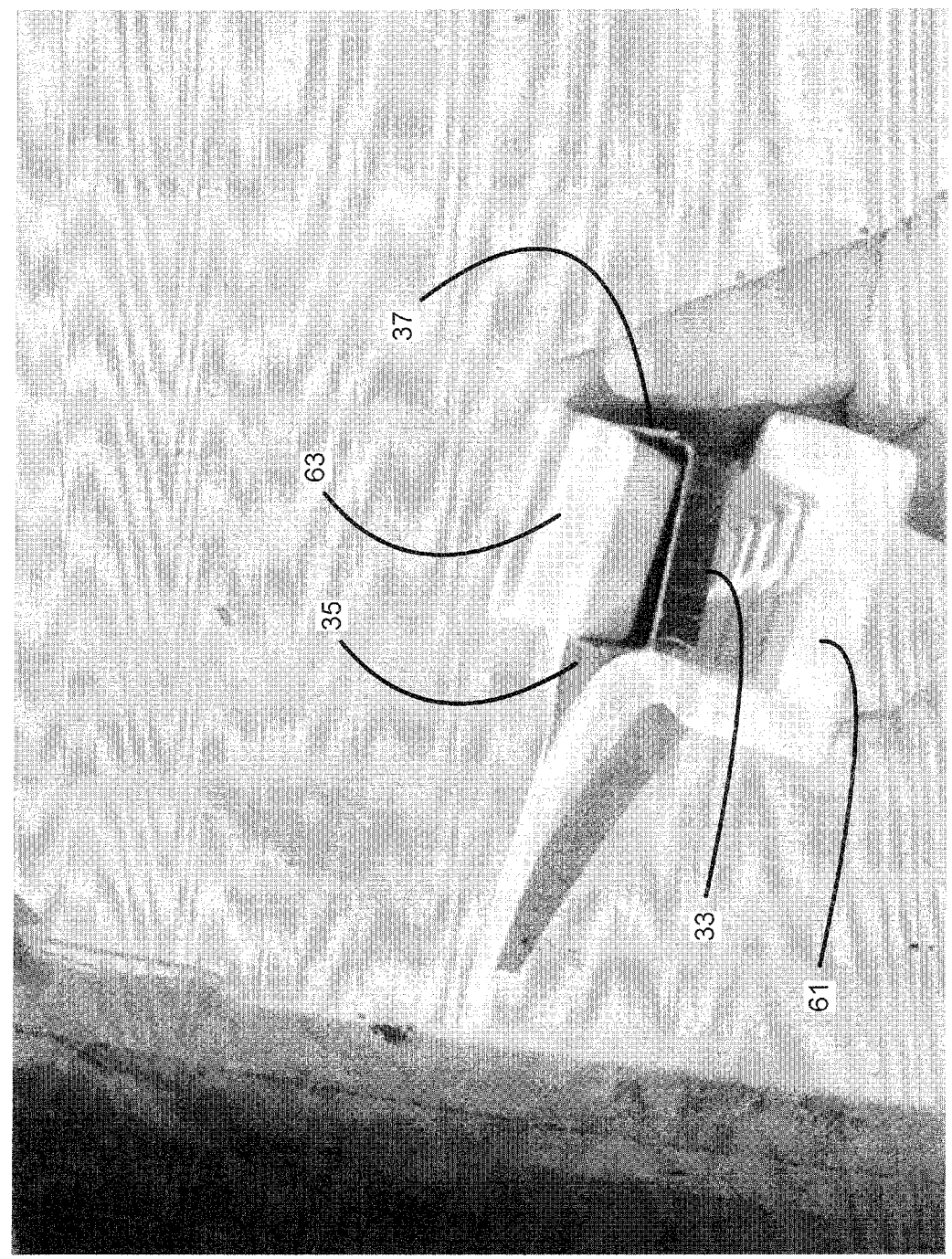
FIGS. 5 and 6 are pictures that illustrate an exemplary molding process for forming the monolithic members of FIGS. 3, 4A and 4B.
Figure 6:
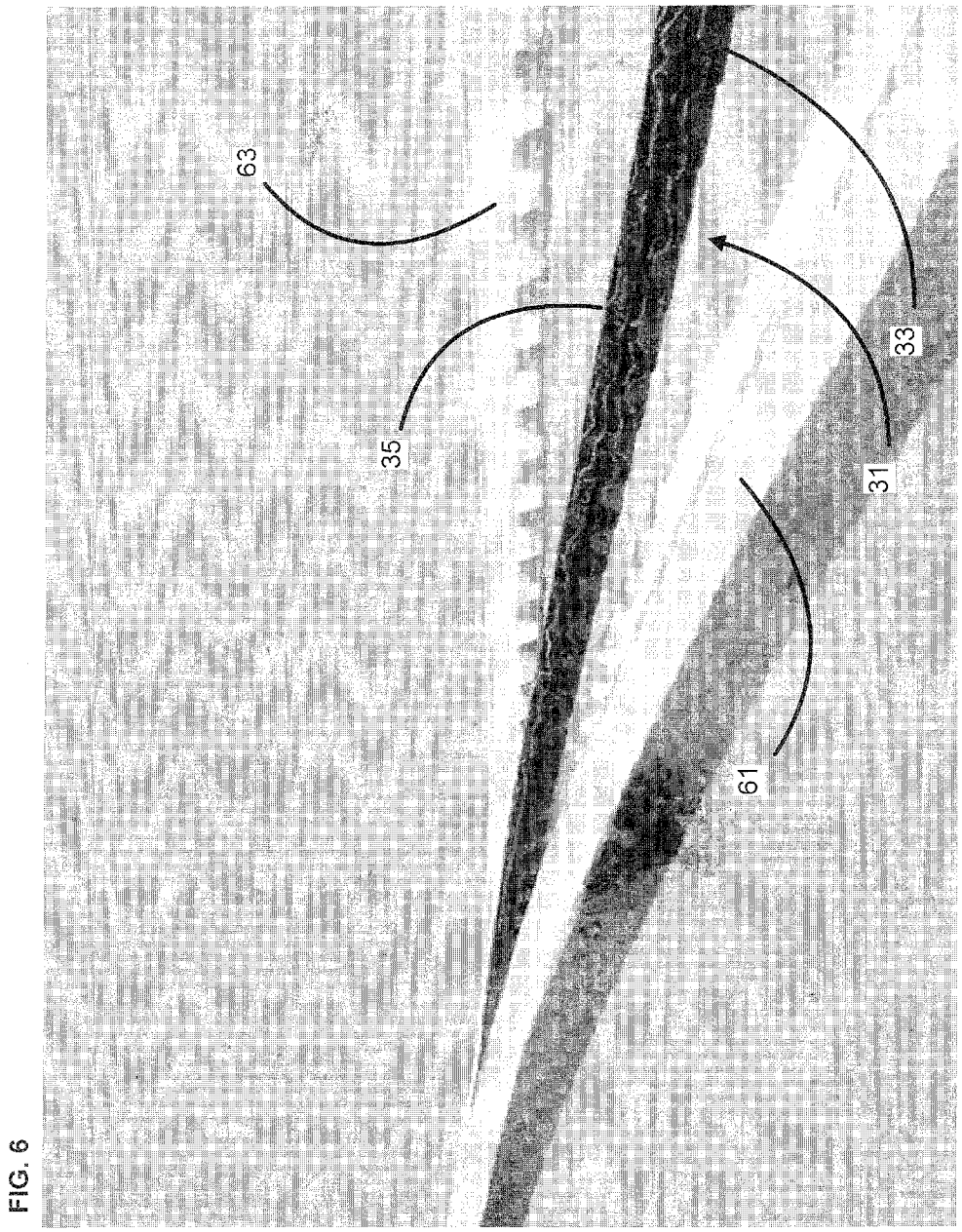

In accordance with the present invention, the airfoil section 15 includes a number of molded monolithic members 31 (FIG. 3) that are secured together in a side-by-side manner along the spanwise direction of the airfoil section 15 as shown in FIGS. 4A and 4B. The monolithic member 31 is realized from continuous material that is molded to form the corrugated portion 33 with the top flange portion 35 and the bottom flange portion 37 extending from the corrugated portion 33 as shown. As a result of the molding operation, the corrugated portion 33 is integrally formed with and joined to the top flange portion 35 and the bottom flange portion 37 as shown. An example of such a molding process is depicted in FIGS. 5 and 6. In the preferred embodiment, the corrugated portions 33 of the molded monolithic members 31 define internal closed-cell core structures 39 extending along the spanwise direction of the airfoil section 15 as shown in the partial cut-away views of FIGS. 4A and 4B. The internal closed-cell core structures 39 provide structural resistance to compressive forces and bending-moment forces acting on the airfoil section 15. The corrugated portions 33 of the adjacent monolithic members 31 are preferably shaped with sets of flat front and rear surfaces 42a, 42b as shown and arranged in a staggered pattern to provide for a polygonal-shape (or honeycomb-shaped) to the closed-cell structure 39 extending along the spanwise direction of the airfoil section 15.

For increased structural resistance to compressive forces and bending-moment forces acting on the airfoil section 15, at least one non-corrugated composite sheet 41 can be disposed between the corrugated portions 33 of adjacent monolithic members 31 as shown in the partial cut-away views of FIGS. 4A and 4B. The sheet 41 interfaces to the opposed flat surfaces of the corrugated portions 33 adjacent thereto and extend parallel to adjacent monolithic members 31, thereby splitting the cells of the polygonal-shaped (or honeycomb-shaped) closed-cell structure 39 into two half-cells disposed on opposite sides of the sheet 41 as shown. The weight and thickness of the non-corrugated composite sheets 41 can be varied to provide for varying degrees of stiffness across the cord of the airfoil section 15 as needed. In the preferred embodiment, the non-corrugated composite sheet 41 is held as a tight column by the walls of the adjacent corrugated portions, thereby maximizing the ability of the composite sheet 41 to resist buckling when stress as a beam.

The side-by-side arrangement of the monolithic members 31 is realized by nesting and securing together multiple molded composite members 31 to form the integrated structure shown in FIGS. 4A and 4B. During the nesting process, one or more non-corrugated composite sheets 41 can be disposed between adjacent corrugated portions 33 as shown. The top flange portion 35 can have a stepped wall 43 that is designed to interface to an edge 45 of the top flange portion 35 of the succeeding monolithic member 31 as the two monolithic members 31 are secured together. Similarly, the bottom flange portion 37 can have a stepped wall 47 that is designed to interface to an edge 49 of the bottom flange portion 37 of the succeeding monolithic member 31 as the two monolithic members 31 are bonded together. In this manner, the stepped walls 43, 47 aid in side-by-side alignment of the nested monolithic members 31. In addition, the stepped walls 43, 47 provide for a wider bond flange between the nested members 31 and aid in providing airtight integrity to the airfoil section 15.

Figure 7A:
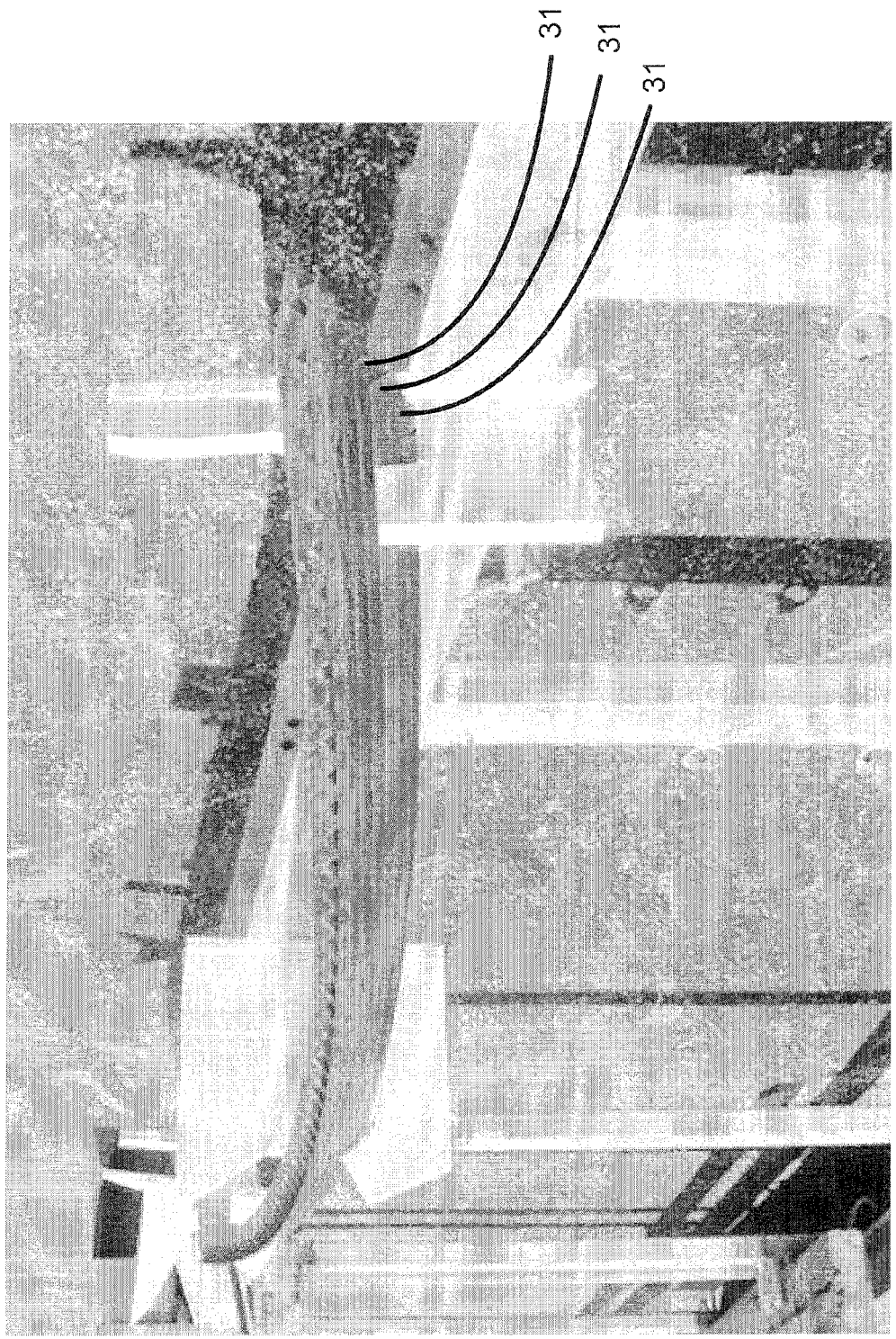
FIG. 7A is a picture that illustrates a side-by-side arrangement of monolithic members that form a portion of the airfoil structure of the wind turbine blade of FIGS. 2A and 2B in accordance with the present invention.
Figure 7B:
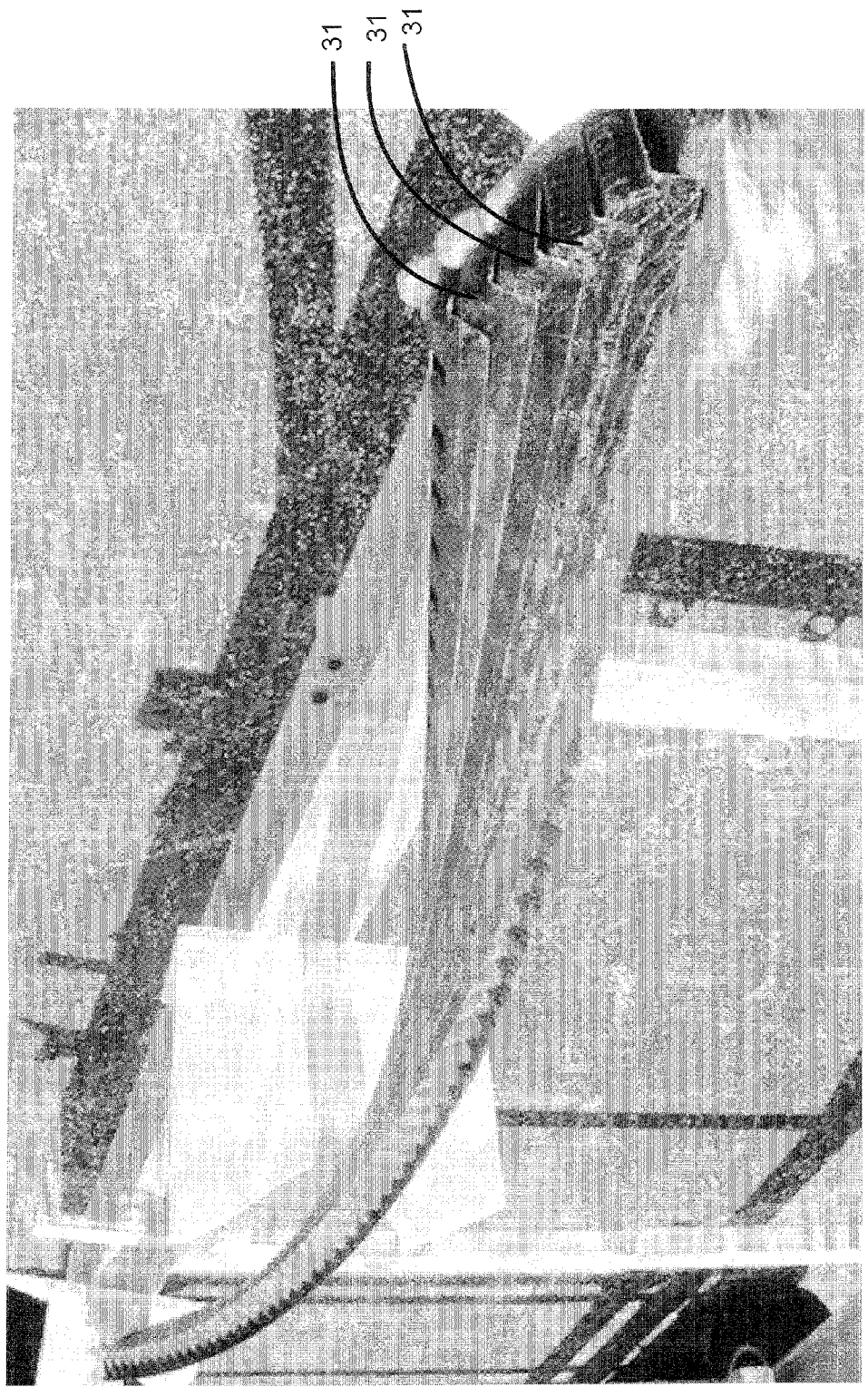
FIG. 7B is a picture that illustrates a side-by-side nested arrangement of monolithic members; the nested arrangement can be used to form a portion of the airfoil structure of the wind turbine blade of FIGS. 2A and 2B with a desired twist angle along the spanwise direction of the blade in accordance with the present invention.

In the side-by-side arrangement of monolithic members, the top flange portions 35 of adjacent monolithic members 31 overlap one another in a nested configuration (as best shown in FIGS. 7A and 7B) and are secured to one another to form a portion of the top surface 20a of the airfoil section 15 as shown in FIG. 4A. With the top surface portion formed in this manner, the underlying corrugated portions 33 (as well as the closed-cell structures defined by such corrugated portions 33) are integrally joined to such top surface portions due to the continuous nature of the monolithic member 11. Similarly, the bottom flange portions 37 of adjacent monolithic composite members 31 overlap one another in a nested configuration (as best shown in FIGS. 7A and 7B) and are secured to one another to form a portion of the bottom surface 20b of the airfoil section 15 as shown in FIG. 4B. With the bottom surface portion formed in this manner, the overlying corrugated portions 33 (as well as the closed-cell structures defined by such corrugated portions 33) are integrally joined to such bottom surface portions due to the continuous nature of the molded composite member 31. Thus, the side-by-side arrangement of monolithic members 31 structurally integrates portions of the top surface 20a and bottom surface 20b to corrugated portions 33 (as well as the closed-cell structures defined by such corrugated portions 33) that extend between such top and bottom surface portions. Such structural integration provides enhanced structural resistance to torsional loading of the airfoil section 15 due to the fact that such loads are resisted by the material that makes up the both top and bottom surfaces 20a, 20b as well as the corrugated portions 33 extending therebetween.

Note that the shape and/or dimensions of the molded monolithic members 31 (and parts thereof) can vary across the spanwise direction of the airfoil section 15 to provide a desired shape or profile along the spanwise direction. The shape and/or dimensions of the molded monolithic members 31 can vary across the chordwise direction to provide a desired shape or profile along the chordwise direction. Such varying shape and/or dimensions can be dictated by multiple molds that are designed to produce monolithic members 31 that when secured together provide the desired profile. Moreover, the shape and/or dimensions of the molded monolithic members 31 can be adapted such that the nested configuration of monolithic members 31 provides a desired profile along the spanwise direction of said airfoil section 15. The profile can substantially lie in a flat plane along the spanwise direction of the airfoil section 15. Alternatively, the profile can twist clockwise or counterclockwise along the spanwise direction of the airfoil section 15 in order to vary angle of incidence of the airfoil section 15 along the spanwise direction (FIG. 7B). In this configuration, a jig is configured to provided the desired twist profile as the monolithic members 31 are secured together to form the airfoil section 15. It is also contemplated that multiple molds can be used to vary the dimensions and shape of the molded monolithic members 31

(and parts thereof) across the spanwise direction of the airfoil section 15 to provide the desired twist profile.

In the preferred embodiment of the present invention, a chordwise portion of the root, span and tip of the airfoil section 15 extending from a central interface (e.g., central stringers 27) to the leading edge 17 is realized from a leading-edge-side group of monolithic members 31 that are secured together in a side-by-side nested manner as described above and illustrated in FIG. 4A. In this configuration, the corrugated portions 31 of the leading-edge-side group have flat surfaces 42a that face the leading edge 17, and the top and bottom flange portions 35, 37 of the leading-edge-side group extend from the respective corrugated portion 31 toward the trailing edge 19 of the airfoil section 15. The leading edge 17 is preferably defined by a molded monolithic member 31' similar to the monolithic members 31, but having a round side 50 that is covered by a cap 51. The molded monolithic member 31' is secured to the adjacent monolithic member 31, and the cap 51 is secured to the round side 50 of the monolithic member 31'.

Similarly, a chordwise portion of the root, span and tip of the airfoil section 15 extending from a central interface (e.g., central stringers 27) to the trailing edge 19 can be realized from a trailing-edge-side group of monolithic members 31 that are secured together in a side-by-side nested manner as shown in FIG. 4B. In this configuration, the corrugated portions 31 of the trailing-edge-side group have flat surfaces 42a that face the trailing edge 19, and the top and bottom flange portions 35, 37 of the trailing-edge-side group extend from the respective corrugated portion 31 toward the leading edge 17 of the airfoil section 15. The trailing edge 19 is preferably defined by a molded monolithic member 31" similar to the monolithic member 31' of the leading edge (but with a significantly smaller radius of curvature) that is covered by a cap 52 that is secured thereto.

A central interface, such as the carbon stringer(s) 27 of FIGS. 2A, 2B, 4A, 4B can extend along the spanwise direction of the airfoil section 15 and provide a transition between the leading-edge-side group of monolithic members 31 and the trailing-edge-side group of monolithic members 31 as described above. The top and bottom flange portions of the monolithic members 31 adjacent the central interface can be secured to the central interface and form portions of the top and bottom surfaces that cover the central interface as best shown in the partial cut-away view of FIGS. 4A and 4B.

The molded monolithic members 31 and other parts of the airfoil section 15 (such as the non-corrugated composite sheets 41 and/or central interface) can be realized from composite materials. A composite material (or composite) is an engineered material made from two or more constituent materials with significantly different physical or chemical properties which remain separate and distinct on a macroscopic level within the finished structure. Plywood is an example of a common composite material. The most primitive composite materials were straw and mud combined to form bricks for building construction. Composites are made up of individual materials referred to as constituent materials. There are two categories of constituent materials: matrix material and reinforcement material. At least one portion of each type is required. The matrix material surrounds and supports the reinforcement materials by maintaining their relative positions. The reinforcement material imparts special mechanical and physical properties to enhance the matrix properties. A synergism produces material properties unavailable from the individual constituent materials. The matrix material experiences a melding event, after which the part shape is essentially set. Depending upon the nature of the matrix material, this melding event can occur in various ways, such as chemical polymerization or solidification from the melted state.

Composite materials suitable for use in the present invention preferably employ a fiber reinforcement material and polymer matrix material often called a resin. There are many different resins that can be used, such as polyester resins, vinyl ester resins, epoxy resins, phenolic resins, polyimide resins, polyamide resins, polypropylene resins, PEEK resins, methacrylate resins, and any combinations thereof. The fiber reinforcement material preferably includes fibers, but can also include ground minerals. The fibers are preferably realized from strong, lightweight material such as glass (e.g., E-glass or S-glass), nylon, polyamides (typically referred to as PA fiber), aromatic polyamides (typically referred to as aramids), Kevlar®, polyethylene (such as ultra-high molecular weight polyethylene, high-modulus polyethylene, and high-performance polyethylene), polyethylene terephthalate (typically referred to as PET fiber), steel, titanium, carbon, basalt, and any combinations thereof. The fiber reinforcement materials can be stitched, woven, braided or otherwise processed into a fabric or other suitable configurations. The physical properties of fiber reinforcement materials (as well as other reinforcement materials) are generally not isotropic (independent of direction of applied force) in nature, but rather are typically orthotropic (different depending on the direction of the applied force or load). In the preferred embodiment, the fiber reinforcement material of the composite parts comprises a multilayer fabric with multiple fabric layers having varying fiber orientations, such as three fabric layers with orientations of 45°, 90°, −45°, respectively.

In general, the composite parts of the present invention are formed by a molding process where the reinforcing and matrix materials are combined, compacted and processed in a mold to undergo a melding event. After the melding event, the part shape is essentially set, although it can deform under certain process conditions. For a thermoset polymeric matrix material, the melding event is a curing reaction that is initiated by the application of additional heat or chemical reactivity. For a thermoplastic polymeric matrix material, the melding event is a solidification from the melted state. For a metal matrix material, the melding event is a fusing at high pressure and a temperature near the melt point.

The parts of the airfoil section 15 (e.g., the molded monolithic members 31, the non-corrugated composite sheets 41 and/or central interface) can be secured together by bonding wherein a resin is applied to the interface between parts as necessary and cured to form the resulting structure. Such boding is particular suited for securing parts realized from composite material and the like. There are many different resins that can be used, such as polyester resins, vinyl ester resins, epoxy resins, phenolic resins, polyimide resins, polyamide resins, polypropylene resins, PEEK resins, methacrylate resins, and any combinations thereof.

A variety of molding processes can be used according to the design requirements of the airfoil section to be made. The principal factors impacting the methodology are the natures of the chosen matrix and reinforcement materials. Another important factor is the gross quantity of material to be produced. Large quantities can be used to justify high capital expenditures for rapid and automated manufacturing technology. Small production quantities are accommodated with lower capital expenditures but higher labor and tooling costs at a correspondingly slower rate.

One of these molding methods, commonly referred to as vacuum bag molding, uses a two-sided mold set that shapes both surfaces of the part. On the lower side is a rigid mold and on the upper side is a flexible membrane or vacuum bag. The flexible membrane can be a reusable silicone material or an extruded polymer film. Vacuum is applied to the mold cavity by a vacuum source (typically a venturi vacuum in combination with an air compressor or vacuum pump). This process can be performed at either ambient or elevated temperatures with ambient atmospheric pressure acting upon the vacuum bag.

Another one of these methods, commonly referred to as pressure bag molding, uses a solid female mold along with a flexible male mold. The reinforcement material is placed inside the female mold with just enough matrix material (e.g., resin) to allow the matrix material to stick in place. A measured amount of matrix material is then added into the female mold and the female mold is then clamped to a machine that contains the flexible male mold. The flexible male mold is then inflated with heated compressed air or possibly steam. The female mold can also be heated. Excess matrix material is forced out along with trapped air.

Another one of these methods, commonly referred to as autoclave molding, uses a two-sided mold set that forms both surfaces of the part. On the lower side is a rigid mold and on the upper side is a flexible membrane made from silicone or an extruded polymer film such as nylon. Reinforcement material and matrix material (typically pre-impregnated into the reinforcement material) is placed into the rigid mold. The upper mold is installed and vacuum is applied to the mold cavity. The assembly is placed into an autoclave. This process is generally performed at both elevated pressure and elevated temperature.

Another one of these methods, commonly referred to as resin transfer molding, utilizes a two-sided mold set that forms both surfaces of the part. The lower side is a rigid mold. The upper side can be a rigid or flexible mold. Flexible molds can be made from composite materials, silicone or extruded polymer films such as nylon. The two sides fit together to produce a mold cavity. The distinguishing feature of resin transfer molding is that the reinforcement materials are placed into this cavity and the mold set is closed prior to the introduction of matrix material. Resin transfer molding includes numerous varieties which differ in the mechanics of how the resin is introduced to the reinforcement in the mold cavity. These variations include everything from vacuum infusion (see also resin infusion) to vacuum assisted resin transfer molding. This process can be performed at either ambient or elevated temperature.

Other types of molding include press molding, transfer molding, pultrusion molding, filament winding, casting, centrifugal casting and continuous casting. The use of curing ovens and paint booths is also needed for some applications.

FIGS. 5 and 6 illustrate a two-sided mold set (lower mold 61 and upper mold 63) for shaping a composite member 31 therein. Continuous composite material is placed between the lower mold 61 and the upper mold 63, and the two molds compacted and processed such that reinforcement material and the matrix material of the composite material undergo a melding event. The floor of the lower mold set and bottom wall of the upper mold set 63 form and shape the corrugated portion 33 of the composite member 31 as best shown in FIG. 6. The opposing vertical side walls of the lower mold 61 and upper mold 63 that extend lengthwise along one side of the mold set form and shape the top flange portion 35 of the corrugated member 31, while the opposing vertical side walls of the lower mold 61 and upper mold 63 that extend lengthwise along the opposing side of the mold set form and shape the bottom flange portion 37 of the corrugated member 31 as best shown in FIG. 5. The opposing sidewalls of the lower mold 61 and upper mold 63 can include stepped interfaces for shaping the stepped walls 43, 47 of the top and bottom flange portions 35, 37 as described herein.

The molded monolithic members 31 and other parts of the airfoil section 15 (such as the non-corrugated composite sheets 41 and/or central interface) can also be realized from non-composite materials, such as a metal or a polymer. For example, metals such as aluminum, titanium, stainless steel, steel, and any combinations thereof can be used. Metals can be molded to form the monolithic members 31 by injection molding, pressing (for example by a transfer press and/or brake press), rolling, and/or other suitable metal forming techniques. In another example, polymer material such as polyester, vinylester, epoxy, urethane, and any combinations thereof can be used. Polymer material can be molded to form the monolithic members 31 by injection molding and/or other suitable polymer forming process.

The parts of the airfoil section 15 (e.g., the molded monolithic members 31, the non-corrugated composite sheets 41 and/or central interface) can be secured together by bonding wherein an adhesive is applied to the interface between parts as necessary and cured to form the resulting structure. Such boding is particular suited for securing parts realized from metal and polymer materials and the like. Alternatively, parts of the airfoil section 15 (e.g., the molded monolithic members 31, the non-corrugated composite sheets 41 and/or central interface) can be secured together by mechanical fasteners such as rivets and machine screws. Such mechanical fasteners are particular suited for securing parts realized from metal and the like.

Figure 8:
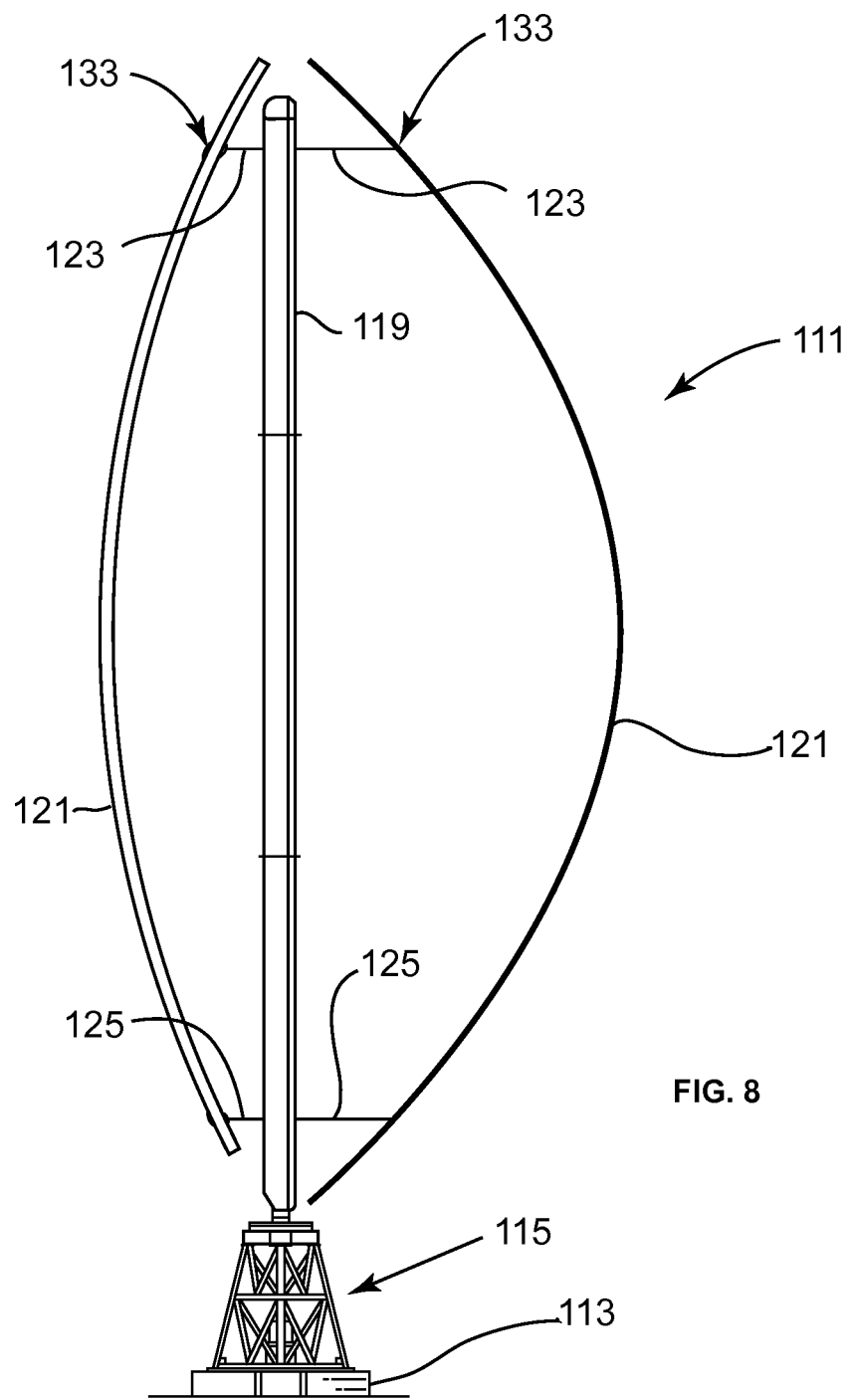
FIG. 8 is a schematic view of an exemplary vertical-axis wind turbine that embodies an airfoil structure in accordance with the present invention.

The airfoil structure and method of fabricating same as described herein can also realize vanes or blades of a Darrieus-type vertical axis wind turbine. The structure of an exemplary Darrieus-type vertical axis wind turbine 111 is illustrated in FIG. 8, which includes a foundation 113 which supports a steel-framed base 115. The base 115 supports a bearing assembly (not shown) that supports rotation of a rotor assembly 117 that includes a tower 119 and multiple blades 121. The rotor assembly 117 is coupled through a gearbox (not shown) to a generator (not shown) located within the base 115 for conversion of wind-powered rotation of the rotor assembly 117 into electrical energy. Hydraulic brakes (not shown) can be used to stop or slow the rotation of the rotor assembly 117 as necessary.

The tower 119 is a rotatable, vertical structure with a set of upper struts 123 that extend between the top portion of the tower 119 and the top portion of respective blades 121 as well as a set of lower struts 125 that extend between the bottom portion of the tower 119 and the bottom portion of respective blades 121. The blades 121 are each realized by an airfoil section 15 as described herein. The upper struts 123 are secured to the top portion of the tower 119, for example, by a bolted connection or other suitable fixation means. The upper struts 123 are secured to the top portion of a respective blade 121 by a bolted connection or other suitable fixation means.

Figure 9:
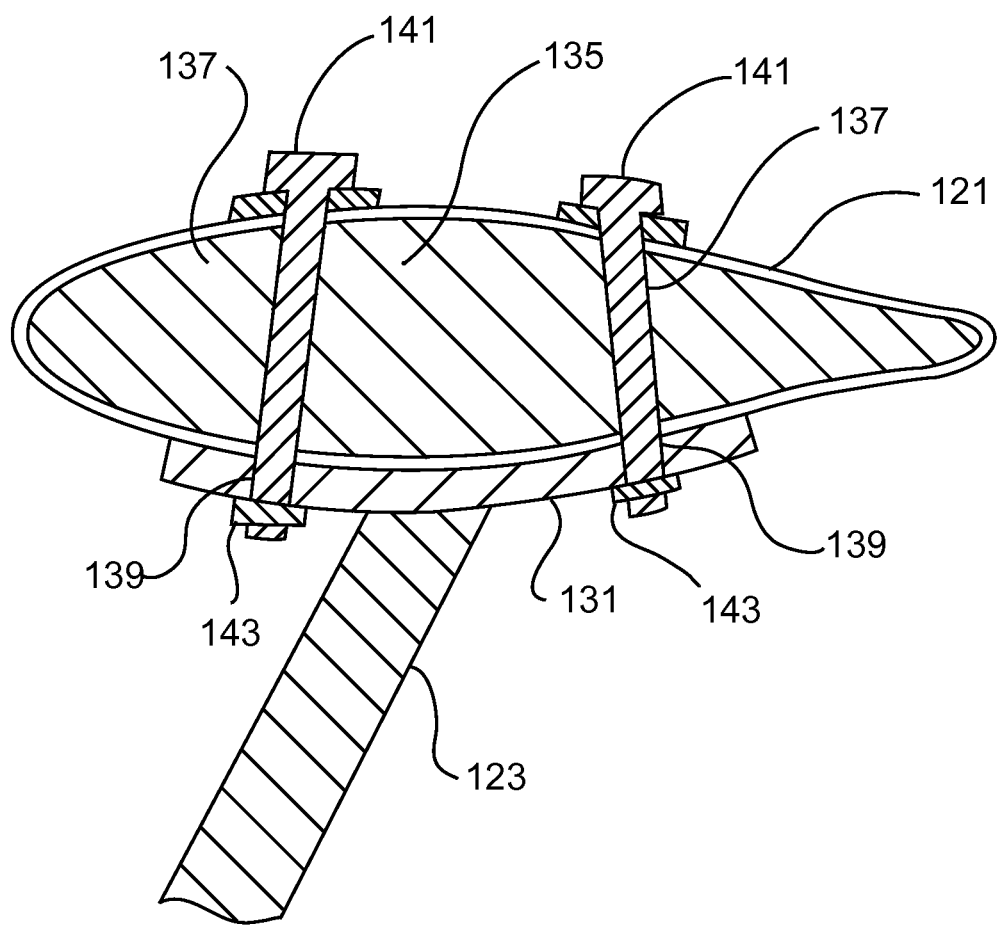
FIG. 9 is a cross-sectional schematic view of an exemplary mount that mechanically secures the struts to respective blades of the vertical-axis wind turbine of FIG. 8.

In the preferred embodiment as shown in FIG. 9, the bolted connection that secures an upper strut 123 to a respective blade 121 includes a flange 131 that is welded or otherwise secured to the end of the upper strut 123. A local portion 133 of the airfoil section of the blade 121 that is intended to be positioned adjacent the flange 131 is filled with epoxy or other reinforcement material that fills the internal closed-cell core structures of the local portion 133 of the blade 121. For simplicity of description, this filled internal closed-cell core structure is represented by the cross-hatching 135 of FIG. 9. Bolts holes 137 are drilled through the filled internal closed cell structure 135 to align with mounting holes 139 through the flange 131. Bolts 141 are inserted through the bolts holes 137 and mounting holes 139. Nuts 143 are fastened to the bolts 141 in order to secure the blade portion to the flange 131 and the upper strut 123 extending therefrom. A similar bolted connection is preferably used to secure a lower strut 125 to a respective blade 121. The bolts 141 and nuts 143 can be substituted by other suitable mechanical fasteners for securing the flange 131 to the local blade portion 133 of the respective blade 121.

It is contemplated that a coating, film or skin can be applied to the top and bottom flange portions of the plurality of molded monolithic members that form the top and bottom surfaces of the airfoil section. For example, a reflective coating can be applied to reduce heating of the airfoil structure resulting from incident sunlight. In another example, a waterproof coating can be applied to limit migration of moisture into the internal elements of the airfoil structure. In yet another example, a skin can be applied to add additional structural strength to and between the molded monolithic members.

Advantageously, the airfoil structures described herein structurally integrate portions of the top and bottom surfaces of the span as well as internal support structures that extend between such top and bottom surfaces. Such structural integration provides enhanced structural resistance to torsional loading of the airfoil along the span due to the fact that such loads are resisted by the continuous molded material that makes up both the top and bottom surfaces as well as the support structures extending therebetween. Such enhanced structural resistance reduces (and preferably eliminate) the need for additional material to stiffen the skin of the airfoil, and thus provides for improved strength-to-weight characteristics of the airfoil while avoiding issues of interlaminar shear stress within skins of composite airfoils, including shear failure of the skin to core that are problematic with composite airfoils.

There have been described and illustrated herein several embodiments of a wind turbine blade with an improved airfoil section and methods of fabricating the blade and its components. While particular embodiments of the invention have been described, it is not intended that the invention be limited thereto, as it is intended that the invention be as broad in scope as the art will allow and that the specification be read likewise. Thus, similar airfoil structures and fabrication methods can be used to realize aircraft wings, propellers, helicopter rotors, fan blades (e.g., fan blades for HVAC or industrial cooling towers or other HVAC and industrial applications) and other aerodynamic structures that require an airfoil. When used for aircraft wings, openings can be provided through the corrugated portions of the molded monolithic members to provide a passageway therethrough (e.g., for wiring, hydraulic lines, control rods, fuel lines, fluid lines, venting, reinforcement rods, etc.). Moreover, while particular shapes and configurations of the molded monolithic members have been disclosed, it will be appreciated that other shapes and configurations of the molded monolithic members can be used as well. For example, the corrugations of the molded monolithic members as described herein can be rounded in nature to define internal rounded-shape cores as part of the airfoil structures. Such internal rounded-shape cores can have a circular shape, oval shape or other rounded shape. In other examples, the corrugations of the molded monolithic members can be shaped and configured to define internal structural cores of arbitrary shape as dictated by design of the airfoil. In addition, while particular types of composite materials and non-composite materials and molding processes have been disclosed, it will be understood that other types of materials and molding processes can be used as well. It will therefore be appreciated by those skilled in the art that yet other modifications could be made to the provided invention without deviating from its spirit and scope as claimed.

What is claimed is:

1. An apparatus comprising:
an airfoil structure including a root, a tip, and a span extending along a spanwise direction between said root and said tip, said span having a top surface opposite a bottom surface, wherein at least part of said span is defined by a plurality of molded monolithic members that extend in a side-by-side manner along the spanwise direction, each molded monolithic member including a corrugated portion with a top flange portion and a bottom flange portion extending from the corrugated portion, said top flange portions of adjacent molded monolithic members overlap one another to define said portion of the top surface; and said bottom flange portions of adjacent molded monolithic members overlap one another to define said portion of the bottom surface, said corrugated portion integrally formed with and joined to said top flange portion and said bottom flange portion, the overlapping top and bottom flange portions have a stepped interface to aid in side-by-side alignment of the plurality of molded monolithic members and provide four distinct planes by which to glue, bond or otherwise affix in sheer the plurality of molded monolithic members.

2. An apparatus according to claim 1, wherein:
said corrugated portions of said molded monolithic members provide structural resistance to shear forces acting on the top and the bottom surfaces of said airfoil structure.

3. An apparatus according to claim 2, wherein:
said corrugated portions of said molded monolithic members provide structural resistance to bending-moment forces, compression forces, and torsional forces acting on said airfoil structure.

4. An apparatus according to claim 1, wherein:
said corrugated portions of said molded monolithic members define internal closed-cell cores extending along the spanwise direction of said airfoil structure.

5. An apparatus according to claim 4, wherein:
said internal closed-cell cores provide structural resistance to shear forces acting on the top and the bottom surfaces of the airfoil.

6. An apparatus according to claim 5, wherein:
said internal closed-cell cores provide structural resistance to bending-moment forces, compression forces, and torsional forces acting on said airfoil structure.

7. An apparatus according to claim 1, further comprising:
at least one non-corrugated sheet disposed between the corrugated portions of adjacent molded monolithic members along the spanwise direction of said airfoil structure.

8. An apparatus according to claim 7, wherein:
the corrugated portions of adjacent molded monolithic members and at least one non-corrugated sheet disposed therebetween define internal closed-cell cores extending along the spanwise direction of said airfoil structure.

9. An apparatus according to claim 8, wherein:
the at least one non-corrugated sheet provides structural resistance primarily to bending-moment forces and compressive forces acting on said airfoil structure.

10. An apparatus according to claim 1, wherein:
the dimensions of said plurality of molded monolithic members vary across the spanwise direction to provide a desired profile along the spanwise direction of said airfoil structure.

11. An apparatus according to claim 1, wherein:
said plurality of molded monolithic members are adapted to be secured together in a nested manner to provide a desired profile along the spanwise direction of said airfoil structure.

12. An apparatus according to claim 11, wherein:
said desired profile substantially lies in a flat plane along the spanwise direction of said airfoil structure.

13. An apparatus according to claim 11, wherein:
said desired profile twists clockwise or counterclockwise along the spanwise direction of said airfoil structure in order to vary angle of incidence of said airfoil structure along the spanwise direction.

14. An apparatus according to claim 4, wherein:
the corrugated portions of adjacent molded monolithic members are arranged in a staggered pattern to define said internal closed-cell cores.

15. An apparatus according to claim 14, wherein:
said internal closed-cell cores are polygonal in shape.

16. An apparatus according to claim 14, wherein:
said internal closed-cell cores are split in half by non-corrugated sheets disposed between corrugated portions of adjacent molded monolithic members.

17. An apparatus according to claim 1, wherein:
said airfoil structure has a rounded leading edge and a tapered trailing edge.

18. An apparatus according to claim 17, wherein:
a first group of said molded monolithic members each have top and bottom flanges that extend away from an underlying corrugated portion toward said trailing edge.

19. An apparatus according to claim 18, wherein:
a plurality of said first group of molded monolithic members each has a set of flat surfaces facing said leading edge.

20. An apparatus according to claim 18, wherein:
one of said first group of molded monolithic members has a rounded side that is covered by a cap to define said leading edge.

21. An apparatus according to claim 17, wherein:
a second group of said molded monolithic members each have top and bottom flanges that extend away from an underlying corrugated portion toward said leading edge.

22. An apparatus according to claim 21, wherein:
a plurality of said second group of molded monolithic members each has a set of flat surfaces facing said trailing edge.

23. An apparatus according to claim 21, wherein:
one of said second group of molded monolithic members has a tapered side that is covered by a cap to define said trailing edge.

24. An apparatus according to claim 17, wherein:
the airfoil structure includes at least one additional support member that extends centrally along the spanwise direction of said airfoil structure.

25. An apparatus according to claim 24, wherein:
the additional support structure comprises a composite box spar.

26. An apparatus according to claim 24, wherein:
the additional support member comprises at least one stringer.

27. An apparatus according to claim 24, wherein:
said at least one additional support member provides a transition between first and second groups of molded monolithic members, wherein the top and bottom flanges of said first group of molded monolithic members extend away from an underlying corrugated portion toward said trailing edge, and wherein the top and bottom flanges of said second group of molded monolithic members extend away from an underlying corrugated portion toward said leading edge.

28. An apparatus according to claim 27, wherein:
the top and bottom flange portions of the molded monolithic members of the first and second group that are disposed adjacent said at least one additional support member provide portions of the top surface and bottom surface that cover said least one additional support member.

29. An apparatus according to claim 1, wherein:
said molded monolithic members are constructed from at least one metal.

30. An apparatus according to claim 29, wherein:
said at least one metal is selected from the group consisting of aluminum, titanium, stainless steel, steel, and any combinations thereof.

31. An apparatus according to claim 1, wherein:
said molded monolithic members are constructed from at least one polymer.

32. An apparatus according to claim 31, wherein:
said at least one polymer is selected from the group consisting of polyester, vinylester, epoxy, urethane, and any combinations thereof.

33. An apparatus according to claim 1, wherein:
said molded monolithic members are realized from at least one composite material.

34. An apparatus according to claim 33, wherein:
said composite material comprises a fiber reinforcement material and a resin matrix material.

35. An apparatus according to claim 34, wherein:
the fiber reinforcement material comprises a multilayer fabric with multiple fabric layers having varying fiber orientations.

36. An apparatus according to claim 35, wherein:
said multilayer fabric comprises three fabric layers with unidirectional fibers oriented at 45°, 90°, −45°, respectively, relative to a longitudinal axis of said multilayer fabric.

37. An apparatus according to claim 34, wherein:
the fiber reinforcement material comprises fibers of a material selected from the group consisting of glass (such as E-glass or S-glass), nylon, polyamides (typically referred to as PA fiber), aromatic polyamides (typically referred to as aramids), Kevlar®, polyethylene (such as ultra-high molecular weight polyethylene, high-modulus polyethylene, and high-performance polyethylene), polyethylene terephthalate (typically referred to as PET fiber), steel, titanium, carbon, basalt, and any combinations thereof.

38. An apparatus according to claim 34, wherein:
the resin matrix material is selected from the group consisting of polyester resins, vinyl ester resins, epoxy resins, phenolic resins, polyimide resins, polyamide resins, polypropylene resins, PEEK resins, methacrylate resins, and any combinations thereof.

39. An apparatus according to claim 7, wherein:
said at least one non-corrugated sheet is realized from a composite material.

40. An apparatus according to claim 39, wherein:
said composite material includes a fiber reinforcement material and a resin matrix material.

41. An apparatus according to claim 40, wherein:
the fiber reinforcement material comprises a multilayer fabric with multiple fabric layers having varying fiber orientations.

42. An apparatus according to claim 41, wherein:
said multilayer fabric comprises three fabric layers with unidirectional fibers oriented at 45°, 90°, −45°, respectively, relative to a longitudinal axis of said multilayer fabric.

43. An apparatus according to claim 40, wherein:
the fiber reinforcement material comprises fibers of a material selected from the group consisting of glass (such as E-glass or S-glass), nylon, polyamides (typically referred to as PA fiber), aromatic polyamides (typically referred to as aramids), Kevlar®, polyethylene (such as ultra-high molecular weight polyethylene, high-modulus polyethylene, and high-performance polyethylene), polyethylene terephthalate (typically referred to as PET fiber), steel, titanium, carbon, basalt, and any combinations thereof.

44. An apparatus according to claim 40, wherein:
the resin matrix material is selected from the group consisting of polyester resins, vinyl ester resins, epoxy resins, phenolic resins, polyimide resins, polyamide resins, polypropylene resins, PEEK resins, methacrylate resins, and any combinations thereof.

45. An apparatus according to claim 1, wherein:
said plurality of molded monolithic members are bonded together by a resin material.

46. An apparatus according to claim 45, wherein:
the resin material is selected from the group consisting of polyester resins, vinyl ester resins, epoxy resins, phenolic resins, polyimide resins, polyamide resins, polypropylene resins, PEEK resins, methacrylate resins, and any combinations thereof.

47. An apparatus according to claim 1, wherein:
said plurality of molded monolithic members are bonded together by welding or brazing.

48. An apparatus according to claim 1, wherein:
said plurality of molded monolith members are secured together by mechanical fasteners such as rivets and machine screws.

49. An apparatus according to claim 1, wherein:
the top and bottom surfaces of the airfoil structure include a coating, film or skin applied to said top and bottom flange portions of said plurality of molded monolithic members.

50. An apparatus according to claim 49, wherein:
said coating is reflective to reduce heating of said airfoil structure resulting from incident sunlight.

51. An apparatus according to claim 49, wherein:
said coating limits migration of moisture into the internal elements of the airfoil structure.

52. An apparatus according to claim 49, wherein:
said skin adds additional structural strength to and between said plurality of molded monolithic members.

53. An apparatus according to claim 1, wherein:
the airfoil structure is part of an aircraft wing or propeller blade.

54. An apparatus according to claim 53, further comprising:
openings through the corrugated portions of said plurality of molded monolithic members to provide a passageway therethrough (e.g., for wiring, hydraulic lines, control rods, fuel lines, fluid lines, venting, reinforcement rods, etc.).

55. An apparatus according to claim 1, wherein:
the airfoil structure is part of a horizontal-axis-type wind turbine blade.

56. An apparatus according to claim 55, further comprising:
a laminate structure of reinforcement members extending from the root of said airfoil structure; and
mounting means for mounting the blade to a rotatable wind turbine hub, the mounting means including a plurality of mechanical fasteners that interface to said laminate structure.

57. An apparatus according to claim 1, wherein:
the airfoil structure comprises a vertical-axis-type wind turbine blade.

58. An apparatus according to claim 55, further comprising:
reinforcement material injected into internal voids formed by said plurality of molded monolithic members that define the span of said blade; and
mounting means for mounting the span of said blade to a rotatable structure, said mounting means including at least one mechanical fastener that interfaces to said reinforcement material.

59. An apparatus according to claim 58, wherein:
said mounting means includes
a top mount interface including at least one mechanical fastener that interfaces to reinforcement material disposed locally in a top portion of the span of said blade, and
a bottom mount interface including at least one mechanical fastener that interfaces to reinforcement material disposed locally in a bottom portion of the span of said blade.

* * * * *